US012757025B2

(12) United States Patent
Ståhl et al.

(10) Patent No.: US 12,757,025 B2
(45) Date of Patent: Oct. 6, 2026

(54) CREDENTIAL HANDLING OF AN IOT SAFE APPLET

(71) Applicant: Telefonaktiebolaget LM Ericsson (PUBL), Stockholm (SE)

(72) Inventors: Per Ståhl, Klagshamn (SE); Juha Sääskilahti, Espoo (FI); Timo Suihko, Espoo (FI); Toni Uotila, Kirkkonummi (FI)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 508 days.

(21) Appl. No.: 18/248,250

(22) PCT Filed: Oct. 9, 2020

(86) PCT No.: PCT/EP2020/078503

§ 371 (c)(1),
(2) Date: Apr. 7, 2023

(87) PCT Pub. No.: WO2022/073623

PCT Pub. Date: Apr. 14, 2022

(65) Prior Publication Data

US 2023/0379717 A1 Nov. 23, 2023

(51) Int. Cl.

*H04W 12/40* (2021.01)
*C08K 3/04* (2006.01)

(Continued)

(52) U.S. Cl.

CPC ............. *H04W 12/40* (2021.01); *C08K 3/041* (2017.05); *C08K 3/08* (2013.01); *C08K 3/22* (2013.01);

(Continued)

(58) Field of Classification Search

CPC ................................................. H04W 4/20-80
See application file for complete search history.

(56) References Cited

U.S. PATENT DOCUMENTS

| | | | |
|---|---|---|---|
| 3,557,895 | A | 1/1971 | Thomas |
| 9,608,993 | B1 | 3/2017 | Camenisch et al. |

(Continued)

FOREIGN PATENT DOCUMENTS

| | | | |
|---|---|---|---|
| EP | 3 171 622 | A1 | 5/2017 |
| EP | 3 557 895 | A1 | 10/2019 |

(Continued)

OTHER PUBLICATIONS

EPO Communication pursuant to Article 94(3) EPC issued for Application No. 20 803 443.9-1218—Jul. 16, 2024.

(Continued)

*Primary Examiner* — San Htun
(74) *Attorney, Agent, or Firm* — Baker Botts L.L.P.

(57) ABSTRACT

There is provided mechanisms for handling credentials of an IoT SAFE applet. A method is performed by a communication device. The communication device stores the IoT SAFE applet in a first security domain of a subscription module in the communication device. The first security domain is free from any subscription profile and is different from any security domain of the subscription module for storing subscription profiles. The IoT SAFE applet is independent from any MNO. The communication device is without credentials for the IOT SAFE applet for establishing secure communication for the communication device with a network node. The method comprises obtaining credentials for the IoT SAFE applet from the network node. The method comprises storing the credentials in the first security domain of the subscription module. The credentials are, after successful storage, accessible only from within the first security domain.

20 Claims, 9 Drawing Sheets

(51) Int. Cl.

| | |
|---|---|
| ***C08K 3/08*** | (2006.01) |
| ***C08K 3/22*** | (2006.01) |
| ***C08K 3/38*** | (2006.01) |
| ***C08K 7/06*** | (2006.01) |
| ***C08K 9/00*** | (2006.01) |
| ***H04W 4/60*** | (2018.01) |
| ***H04W 12/0431*** | (2021.01) |
| ***H04W 12/069*** | (2021.01) |
| ***H04W 12/086*** | (2021.01) |
| ***H04W 12/37*** | (2021.01) |

(52) U.S. Cl.

CPC .................. *C08K 3/38* (2013.01); *C08K 7/06* (2013.01); *C08K 9/00* (2013.01); *H04W 12/0431* (2021.01); *H04W 12/069* (2021.01); *H04W 12/086* (2021.01); *H04W 12/37* (2021.01); *C08K 2003/0806* (2013.01); *C08K 2003/2227* (2013.01); *C08K 2003/385* (2013.01); *C08K 2201/001* (2013.01); *C08K 2201/011* (2013.01); *H04W 4/60* (2018.02); *Y02W 30/62* (2015.05)

(56) References Cited

U.S. PATENT DOCUMENTS

| | | | | |
|---|---|---|---|---|
| 10,924,923 | B2 | 2/2021 | Park et al. | |
| 11,838,752 | B2 | 12/2023 | Park et al. | |
| 2008/0022089 | A1 | 1/2008 | Leedom | |
| 2014/0140507 | A1* | 5/2014 | Park | H04W 8/183 380/247 |
| 2016/0301529 | A1 | 10/2016 | Park et al. | |
| 2017/0048713 | A1* | 2/2017 | Guday | H04W 12/35 |
| 2017/0077975 | A1 | 3/2017 | Wang et al. | |
| 2017/0295172 | A1 | 10/2017 | Ahrens et al. | |
| 2018/0121661 | A1 | 5/2018 | Guccione et al. | |
| 2019/0230496 | A1* | 7/2019 | Wane | H04M 15/56 |
| 2019/0268765 | A1 | 8/2019 | Park et al. | |
| 2019/0335319 | A1 | 10/2019 | Li | |
| 2019/0380026 | A1 | 12/2019 | Lee et al. | |
| 2020/0035150 | A1 | 1/2020 | Hu | |
| 2020/0084622 | A1 | 3/2020 | Yoon et al. | |
| 2020/0264857 | A1 | 8/2020 | Koo et al. | |
| 2020/0288298 | A1* | 9/2020 | Li | H04W 8/183 |
| 2021/0076205 | A1* | 3/2021 | Grippo | H04W 12/04 |
| 2021/0168598 | A1 | 6/2021 | Park et al. | |
| 2021/0385635 | A1 | 12/2021 | Johansson et al. | |
| 2022/0109996 | A1* | 4/2022 | Lee | H04W 12/50 |
| 2023/0169682 | A1 | 6/2023 | Rao et al. | |

FOREIGN PATENT DOCUMENTS

| | | | |
|---|---|---|---|
| WO | 2020 035150 | A1 | 2/2020 |
| WO | WO2023169682 | A1 | 9/2023 |

OTHER PUBLICATIONS

PCT Notification of Transmittal of the International Preliminary Report on Patentability issued for International application No. PCT/EP2020/078503—Jan. 19, 2023.

PCT Notification of Transmittal of the International Search Report and the Written Opinion of the International Searching Authority, or the Declaration issued for International application No. PCT/EP2020/078503—Jun. 8, 2021.

Benedek Kovacs et al., "Optimizing UICC modules for IoT applications"—Apr. 2020.

GSMA—Secured Applets for Mobile Configuration, Version 1.0 Draft 8—Jul. 16, 2019.

PCT Written Opinion of the International Preliminary Examining Authority issued for International application No. PCT/EP2020/078503—Sep. 5, 2022.

Lightweight Machine to Machine Technical Specification: Core; Approved Version 1.1 [due to size, this reference has been split into four parts]—Jul. 10, 2018.

Lightweight Machine to Machine Technical Specification: Transport Bindings; Approved Version 1.1 [due to size, this reference has been split into two parts]—Jul. 10, 2018.

3GPP TR 33.899 V1.3.0 (Aug. 2017); 3rd Generation Partnership Project; Technical Specification Group Services and System Aspects; Study on the security aspects of the next generation system (Release 14).

GSMA—Common Implementation Guide to Using the SIM as a 'Root of Trust' to Secure IoT Applications, Version 1.0, Dec. 3, 2019.

GMSA—IoT Security Applet Interface Description, Version 1.0, Mar. 12, 2019.

GSMA—Remote Provisioning Architecture for Embedded UICC Technical Specification, Version 4.0—Feb. 25, 2019.

GSMA—SGP.22 RSP Technical Specification, Version 2.2.2—Jun. 5, 2020.

E. Rescorla et al., "The Transport Layer Security (TLS) Protocol" Version 1.3—Aug. 2018.

PCT International Search Report issued for International application No. PCT/EP2020/082151—Jul. 9, 2021.

* cited by examiner

200

CREDENTIAL HANDLING OF AN IOT SAFE APPLET

PRIORITY

This nonprovisional application is a U.S. National Stage Filing under 35 U.S.C. § 371 of International Patent Application Serial No. PCT/EP2020/078503 filed Oct. 9, 2020 and entitled "CREDENTIAL HANDLING OF AN IOT SAFE APPLET," which is hereby incorporated by reference in its entirety.

TECHNICAL FIELD

Embodiments presented herein relate to methods, a communication device, a network node, computer programs, and a computer program product for handling credentials of an IoT SAFE applet.

BACKGROUND

The IoT SAFE applet, where IoT is short for Internet-of-Things, where SAFE is short for SIM Applet For End-to-end communication, and where SIM is short for Subscriber Identity Module, aims at leveraging the SIM to establish/provision long-term credentials on a communication device for use to establish secure communication between the communication device and an IoT service. IoT SAFE is also the name of the security applet running on the SIM card (such as the universal integrated circuit card (UICC), embedded UICC (eUICC), or integrated UICC (iUICC)), commonly referred to as UICC or subscription module hereinafter. As used hereinafter the term IoT SAFE applet will refer to the applet. A first variant of the IoT SAFE applet supports cryptographic operations that make use of both asymmetric and symmetric credentials whereas a second variant of the IoT SAFE applet only supports cryptographic operations using symmetric credentials for use with very constrained devices.

The IoT SAFE applet provides operations, involving the long-term credentials, for use by the communication device when establishing secure communication with the IoT service and where the long-term credentials never leave the UICC. IoT SAFE v1.0 currently supports establishing secure communication based on the Datagram Transport Layer Security (DTLS) protocol and the Transport Layer Security (TLS) protocol, where both v1.2 and v1.3 of (D)TLS are supported. Hence, the operations currently defined for the IoT SAFE applet are those needed for (D)TLS 1.2 and (D)TLS 1.3.

A UICC supports security domains for isolation of code and data owned and controlled by different parties such as the MNO and the UICC manufacturer. The IoT SAFE applet is either provisioned to the UICC at manufacturing of the UICC or, in case of eUICC, the IoT SAFE applet may alternatively be downloaded to the eUICC as part of the subscription profile. In the latter case the IoT SAFE applet is part of the same security domain as the subscription profile, or a subdomain of this domain. In the first case the IoT SAFE applet may belong to a security domain associated with a subscription profile or a separate security domain. The way to establish/provision credentials to the IoT SAFE applet is either through the use of SIM over-the-air (OTA) mechanisms of the mobile network operator (MNO), or UICC vendor, or through pre-provisioning during manufacturing of the UICC. IoT SAFE v1.0 also specifies the option to allow a device application to use the interface to generate credentials (e.g. device private and public key pair where the private key is kept inside IoT SAFE applet) and to store credentials (e.g. device certificate containing the public key). These credentials can then be used in operations similar to those established via SIM OTA. How the trust in these credentials is established with a potential remote entity is up to the device application. Only the first mentioned variant of the IoT SAFE applet supports generation and storage of credentials triggered by a device application.

For constrained battery powered IoT devices connecting over Low-Power Wide-Area (LPWA) networks such as Narrow-Band IoT networks the subscription profile should be kept as small as possible in order to save power during the download of the subscription profile. In a subscription profile for constrained IoT devices only network access authentication credentials, international mobile subscriber identity (IMSI), and a few other network configuration parameters might be required, resulting in a subscription profile of a few hundred bytes. For example, no SIM OTA is needed as part of such a profile. The second mentioned variant of the IoT SAFE is several tens of kilobytes in size, which comparatively much with respect to the parts of the subscription profile necessary for gaining network access. The first mentioned variant is even bigger than that. Hence, for constrained battery powered IoT devices, the IoT SAFE applet needs to be pre-installed on the UICC not to ruin the power budget.

Some issues relating to having a pre-installed IoT SAFE applet that have been discovered will now be disclosed.

The IoT SAFE applet becomes specific per MNO when the SIM OTA mechanism is used by the IoT SAFE applet. Although the SIM OTA secure channel is standardized, the set of commands, mechanisms, and message formats used for provisioning over the air are linked to provisioning infrastructure specific to each MNO. In case of a subscription module with pre-installed IoT SAFE applet it must thus be known at manufacturing of the subscription module which MNO is to be used such that the proper subscription profile and IoT SAFE applet are installed. This information might not be available at the time of manufacturing of the subscription module.

Having credential(s) pre-installed at manufacturing of the subscription module causes the credential(s) to be exposed to the manufacturer of the subscription module. This requires logistics for secure exchange of credential(s) between the MNO and the manufacturer of the subscription module.

Hence, there is a need for improved handling of credentials of an IoT SAFE applet, for example in terms of how to reduce exposure of the credentials and/or how to handle situations where the MNO is unknown at at the time of manufacturing of the subscription module.

SUMMARY

An object of embodiments herein is to provide efficient handling of credentials of an IoT SAFE applet whereby the issues noted above are resolved.

According to a first aspect there is presented a method for handling credentials of an IoT SAFE applet. The method is performed by a communication device. The communication device stores the IoT SAFE applet in a first security domain of a subscription module in the communication device. The first security domain is free from any subscription profile and is different from any security domain of the subscription module for storing subscription profiles. The IoT SAFE applet is independent from any MNO. The communication device is without credentials for the IoT SAFE applet for establishing secure communication for the communication device with a network node. The method comprises obtaining credentials for the IoT SAFE applet from the network node. The method comprises storing the credentials in the first security domain of the subscription module. The credentials are, after successful storage, accessible only from within the first security domain. The method comprises establishing, using the IoT SAFE applet and at least one of the credentials, secure communication for the communication device with the network node.

According to a second aspect there is presented a communication device for handling credentials of an IoT SAFE applet. The communication device stores the IoT SAFE applet in a first security domain of a subscription module in the communication device. The first security domain is free from any subscription profile and is different from any security domain of the subscription module for storing subscription profiles. The IoT SAFE applet is independent from any MNO. The communication device is without credentials for the IoT SAFE applet for establishing secure communication for the communication device with a network node. The communication device comprises processing circuitry. The processing circuitry is configured to cause the communication device to obtain credentials for the IoT SAFE applet from the network node. The processing circuitry is configured to cause the communication device to store the credentials in the first security domain of the subscription module. The credentials are, after successful storage, accessible only from within the first security domain. The processing circuitry is configured to cause the communication device to establish, using the IoT SAFE applet and at least one of the credentials, secure communication for the communication device with the network node.

According to a third aspect there is presented a communication device for handling credentials of an IoT SAFE applet. The communication device stores the IoT SAFE applet in a first security domain of a subscription module in the communication device. The first security domain is free from any subscription profile and is different from any security domain of the subscription module for storing subscription profiles. The IoT SAFE applet is independent from any MNO. The communication device is without credentials for the IoT SAFE applet for establishing secure communication for the communication device with a network node. The communication device comprises an obtain module configured to obtain credentials for the IoT SAFE applet from the network node. The communication device comprises a store module configured to store the credentials in the first security domain of the subscription module. The credentials are, after successful storage, accessible only from within the first security domain. The communication device comprises an establish module configured to establish, using the IoT SAFE applet and at least one of the credentials, secure communication for the communication device with the network node.

According to a fourth aspect there is presented a computer program for handling credentials of an IoT SAFE applet. The computer program comprises computer program code which, when run on processing circuitry of a communication device, causes the communication device to perform a method according to the first aspect.

According to a fifth aspect there is presented a method for handling credentials of an IoT SAFE applet. The method is performed by a network node. The method comprises generating credentials for the IoT SAFE applet. The method comprises providing the credentials for the IoT SAFE applet to a communication device. The method comprises establishing, using at least one of the credentials, secure communication with the communication device.

According to a sixth aspect there is presented a network node for handling credentials of an IoT SAFE applet. The network node comprises processing circuitry. The processing circuitry is configured to cause the network node to generate credentials for the IoT SAFE applet. The processing circuitry is configured to cause the network node to provide the credentials for the IoT SAFE applet to a communication device. The processing circuitry is configured to cause the network node to establish, using at least one of the credentials, secure communication with the communication device.

According to a seventh aspect there is presented a network node for handling credentials of an IoT SAFE applet. The network node comprises a generate module configured to generate credentials for the IoT SAFE applet. The network node comprises a provide module configured to provide the credentials for the IoT SAFE applet to a communication device. The network node comprises an establish module configured to establish, using at least one of the credentials, secure communication with the communication device.

According to an eighth aspect there is presented a computer program for handling credentials of an IoT SAFE applet, the computer program comprising computer program code which, when run on processing circuitry of a network node, causes the network node to perform a method according to the fifth aspect.

According to a ninth aspect there is presented a computer program product comprising a computer program according to at least one of the fourth aspect and the eighth aspect and a computer readable storage medium on which the computer program is stored. The computer readable storage medium could be a non-transitory computer readable storage medium.

Advantageously these methods, these communication devices, these network nodes, these computer programs, and this computer program product, provide efficient handling of credentials of an IoT SAFE applet such that the above issues can be avoided.

Advantageously these methods, these communication devices, these network nodes, these computer programs, and this computer program product enable the IoT SAFE technology for establishing and using credentials between a device application and an IoT service to be used also on constrained battery powered IoT devices.

Advantageously these methods, these communication devices, these network nodes, these computer programs, and this computer program product enable an MNO to offer a service to provide content, in terms of credential(s), to the IoT SAFE applet in a secure way, through the standard subscription profile delivery mechanism.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

Figure 1:
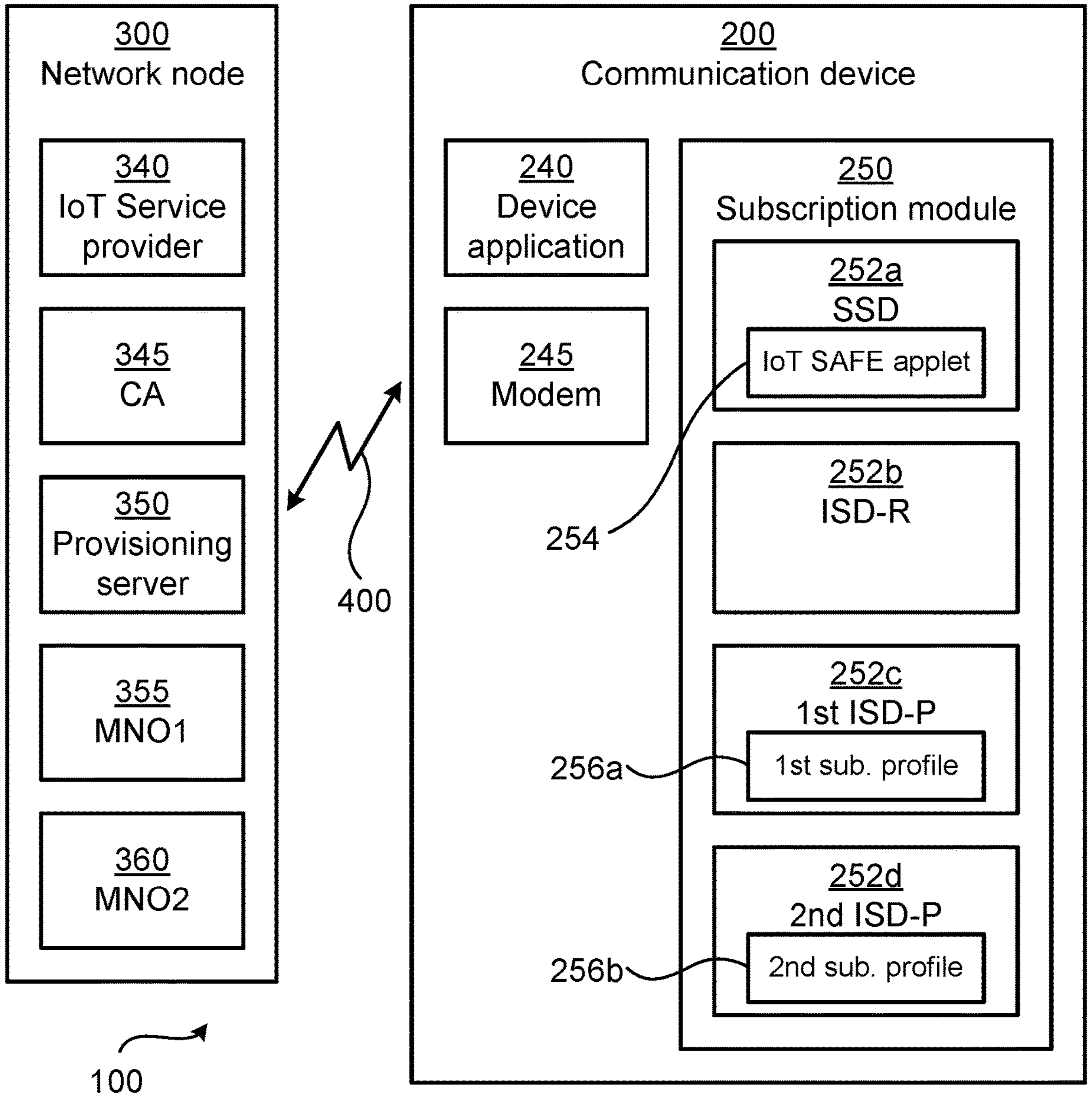
FIG. 1 is a schematic diagram illustrating a communication system according to embodiments.

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

The wording that a certain data item or piece of information is obtained by a first device should be construed as that data item or piece of information being retrieved, fetched, received, or otherwise made available to the first device. For example, the data item or piece of information might either be pushed to the first device from a second device or pulled by the first device from a second device. Further, in order for the first device to obtain the data item or piece of information, the first device might be configured to perform a series of operations, possible including interaction with the second device. Such operations, or interactions, might involve a message exchange comprising any of a request message for the data item or piece of information, a response message comprising the data item or piece of information, and an acknowledge message of the data item or piece of information. The request message might be omitted if the data item or piece of information is neither explicitly nor implicitly requested by the first device.

The wording that a certain data item or piece of information is provided by a first device to a second device should be construed as that data item or piece of information being sent or otherwise made available to the second device by the first device. For example, the data item or piece of information might either be pushed to the second device from the first device or pulled by the second device from the second device. Further, in order for the first device to provide the data item or piece of information to the second device, the first device and the second device might be configured to perform a series of operations in order to interact with each other. Such operations, or interaction, might involve a message exchange comprising any of a request message for the data item or piece of information, a response message comprising the data item or piece of information, and an acknowledge message of the data item or piece of information. The request message might be omitted if the data item or piece of information is neither explicitly nor implicitly requested by the second device.

As disclosed above there is a need for improved handling of credentials of an IoT SAFE applet, for example in terms of how to reduce exposure of the credentials and/or how to handle situations where the MNO is unknown at at the time of manufacturing of the subscription module. Further in this respect, it is envisioned that credential(s) can be downloaded as part of the subscription profile. However, since the credentials for the IoT SAFE applet must not be readable by any device application, it becomes cumbersome for the IoT SAFE applet residing in one security domain at the subscription module to make use of credential(s) being part of the subscription profile ending up in another security domain. Another issue concerns how to ensure that the credential(s) is/are only used with the MNO of the linked subscription profile and not usable at later stages in case the subscription profile is changed. Another issue concerns communication devices that are moved geographically and that uses different subscription profiles depending on their location and that would like to use the same credential(s) towards the IoT service whilst being served by networks of different MNOs.

FIG. 1 is a schematic diagram illustrating a communication system 100 where embodiments presented herein can be applied. The communication system 100 comprises a communication device 200 and a network node 300 that are configured to communicate with each other over a wireless link 400.

In turn, the communication device 200 comprises a device application 240, a modem 245, and a subscription module 250. In turn, the subscription module 250 comprises security domains, such as a Supplementary Security Domain (SSD) 252*a*, an Issuer Security Domain Root (ISD-R) 252*b*, a first Issuer Security Domain Profile (ISD-P) 252*c*, and a second ISD-P 252*d*. The SSD 252*a* stores an IoT SAFE applet 254. The first ISD-P 252*c* stores a first subscription profile 256*a*, and the second ISD-P 252*d* stores a second subscription profile 256*b*.

The network node 300 might act as, fulfil the roles of, or implement the functionalities of, an IoT service provider 340, a certificate authority (CA) 345, a provisioning server 340, a first MNO 355, and a second MNO 360. The entities 340:360 might be implemented separately, or be co-located and integrated together.

The communication device 200 might be an IoT device and comprises a realization of a SIM functionality, provided by a subscription module, supporting remote SIM provisioning according the GSM Association (GSMA; where GSM is short for or Global System for Mobile communications), either the Machine-to-Machine (M2M) variant or the consumer variant. The subscription module might be an eUICC, iUICC, ieUICC, UICC, or a Smart Secure Platform (SSP) such as any of an integrated SSP (iSSP), an embedded SSP (eSSP) or a removable SSP (rSSP). The communication device 200 comprises a wireless modem supporting at least one cellular standard from the 3rd Generation Partnership Project (3GPP).

The subscription module comprises an IoT SAFE applet that is pre-installed at manufacturing of the subscription module. The IoT SAFE applet is meant to be common for use by any MNO and typically does not contain any SIM OTA mechanism support for credential provisioning/establishment. From a security point of view the IoT SAFE applet might reside in a dedicated separate security domain on the subscription module. Such a security domain is referred to as Supplementary Security Domain (SSD). A third party might be the application provider of the IoT SAFE applet. Alternatively, the IoT SAFE applet resides in the Issuer Security Domain Root (ISD-R) security domain of the subscription module. At device installation/commissioning the subscription module may be configured with a provisioning/bootstrapping subscription profile such that the communication device 200 can get initial connectivity and download an operational subscription profile. The provisioning/bootstrapping subscription profile resides in a security domain separate from the security domain of the IoT SAFE applet and typically separate from the ISD-R. As part of download and installation of a new subscription profile, such as an operational subscription profile, a new security domain is created where the subscription profile is stored. Such a security domain is referred to as Issuer Security Domain Profile (ISD-P). The communication device 200 might further comprise a further wireless modem which can be used to locally connect the communication device 200 to a primary device in order to get connectivity such that an operational subscription profile can be downloaded to the communication device 200.

The communication device 200 comprises an application that is configured to establish secure communication (e.g. based on the DTLS protocol) with a remote server of an IoT service provider utilizing the IoT SAFE applet of the subscription module according to the IoT SAFE framework. The remote server may be a device and data management server and the protocol used for communication between the communication device 200 and the device and data management server might, for example, be the Open Mobile Alliance (OMA) LwM2M protocol, where LwM2M is short for Lightweight Machine-to-Machine.

The MNO provides cellular connectivity for the communication device 200. The MNO also assists the owner/manager (e.g. an enterprise) of the communication device 200 in establishing credentials for secure communication between a remote server of the IoT service provider and the communication device 200 leveraging the subscription module, in particular the IoT SAFE applet.

The IoT service provider is a provider of an IoT service and hosting a remote server to which a set of devices, such as communication device 200, would like to securely connect to using e.g. the DTLS protocol. One purpose is for the devices to report sensor data to the IoT service provider. The IoT service provider may be the owner of the devices or license the devices for its service.

The provisioning server handles profile download and may also handle profile management operations. Depending on the GSMA RSP variant used the provisioning server may either be a Subscription Manager-Data Preparation plus (SM-DP+) server (for the consumer variant), or a Subscription Manager-Data Preparation (SM-DP) server and a Subscription Manager-Secure Routing (SM-SR) server (for the M2M variant). The provisioning server is either operated by the MNO providing the operational subscription profile or a third party trusted by the MNO.

The embodiments disclosed herein relate to mechanisms for handling credentials of an IoT SAFE applet. In order to obtain such mechanisms there is provided a communication device 200, a method performed by the communication device 200, a computer program product comprising code, for example in the form of a computer program, that when run on processing circuitry of the communication device 200, causes the communication device 200 to perform the method. In order to obtain such mechanisms there is further provided a network node 300, a method performed by the network node 300, and a computer program product comprising code, for example in the form of a computer program, that when run on processing circuitry of the network node 300, causes the network node 300 to perform the method.

Figure 2:
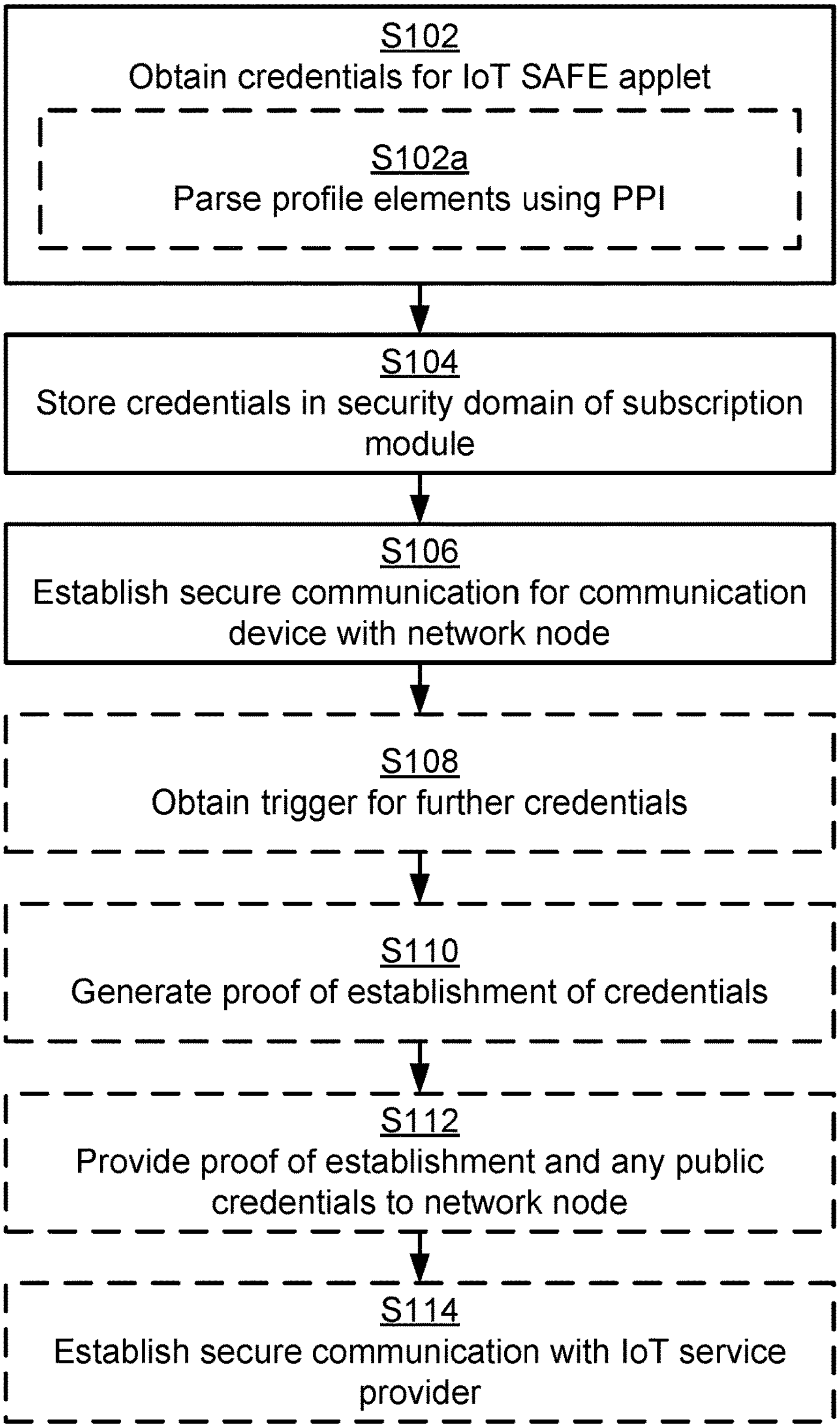
FIGS. 2 and 3 are flowcharts of methods according to embodiments.
Figure 4:
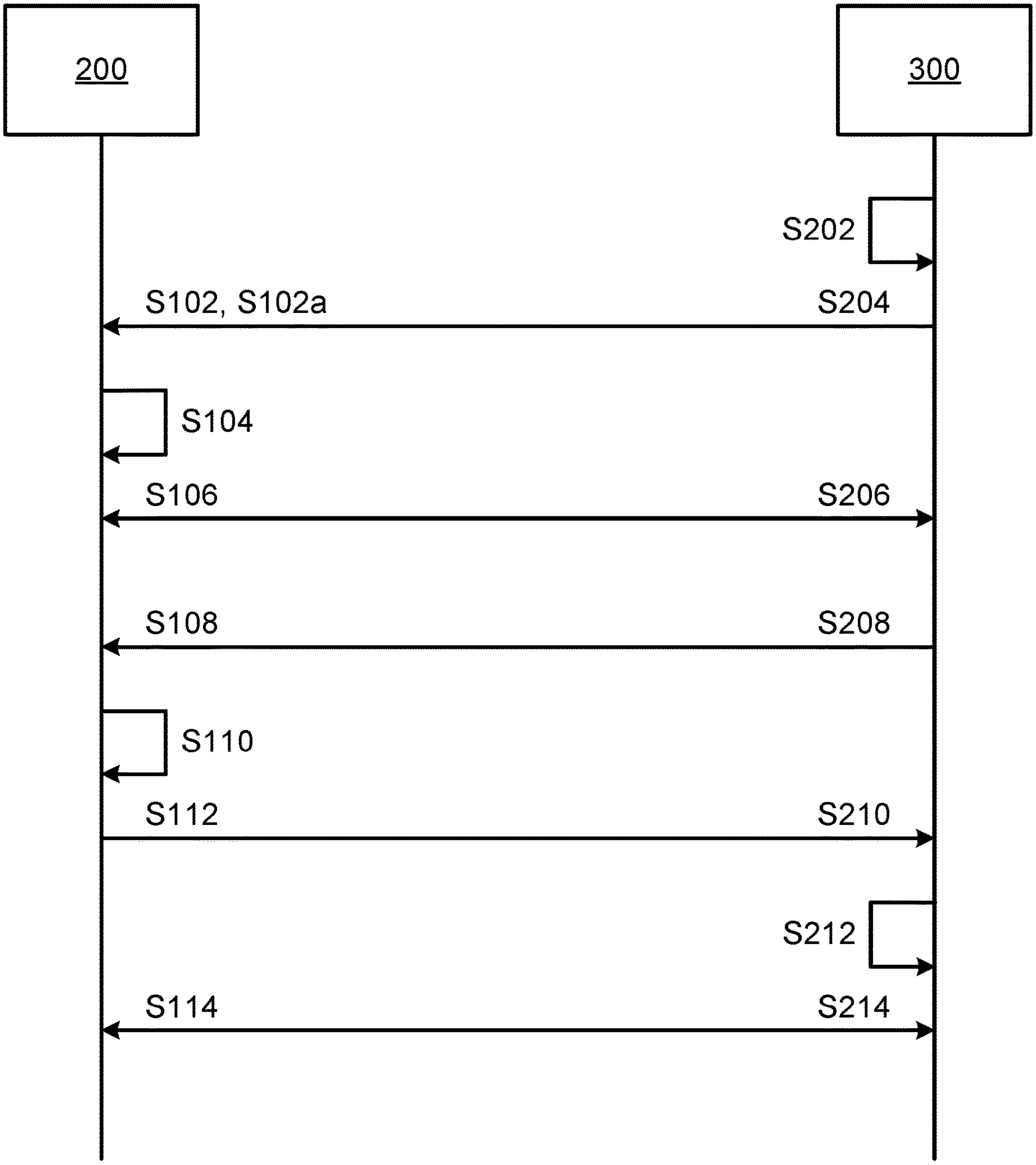
FIGS. 4, 5 and 6 are signalling diagrams of methods according to embodiments.

Reference is now made to FIG. 2 illustrating a method for handling credentials of an IoT SAFE applet as performed by the communication device 200 according to an embodiment. Parallel reference is made to the signalling diagram of FIG. 4. The communication device 200 is storing the IoT SAFE applet in a first security domain of a subscription module in the communication device 200. The first security domain is free from any subscription profile and is different from any security domain of the subscription module for storing subscription profiles. The IoT SAFE applet is independent from any MNO. The communication device 200 is without credentials for the IoT SAFE applet for establishing secure communication for the communication device 200 with a network node 300.

S102: The communication device 200 obtains credentials for the IoT SAFE applet from the network node 300.

S104: The communication device 200 stores the credentials in the first security domain of the subscription module. The credentials are, after successful storage, accessible only from within the first security domain.

S106: The communication device 200 establishes, using the IoT SAFE applet and at least one of the credentials, secure communication for the communication device 200 with the network node 300.

Embodiments relating to further details of handling credentials of an IoT SAFE applet as performed by the communication device 200 will now be disclosed.

Since further credentials will be introduced below, the above introduced credentials (i.e., the credentials as obtained in step S102, stored in step S104, and used in step S106) will hereinafter be referred to as first credentials.

As disclosed above, the communication device 200 is storing the IoT SAFE applet. There could be different ways for the communication device 200 to obtain, or be provided with, the IoT SAFE applet in the first place. Different embodiments relating thereto will now be described in turn.

In some aspects, the IoT SAFE applet is provided to the communication device 200 as part of manufacturing of the communication device 200. According to a first embodiment, the communication device 200 is thus preconfigured with the IoT SAFE applet.

In some aspects, the IoT SAFE applet is downloaded to the communication device 200 as part of subscription profile download. That is the communication device 200 might have a subscription profile, and according to a second embodiment the IoT SAFE applet is downloaded to the communication device 200 as part of the subscription profile being downloaded to the communication device 200. Then. as part of installing the subscription profile into the subscription module, the subscription profile, except the IoT SAFE applet, is stored in at least one other security domain (such as a first ISD-P or a second ISD-P, etc.) of the subscription module, and the IoT SAFE applet is stored in the first security domain.

In some aspects, the IoT SAFE applet is pre stored in the first security domain of the subscription module. According to a third embodiment, the first security domain of the subscription module is thus pre-configured with the IoT SAFE applet.

As disclosed above, the communication device 200 in step S102 obtains first credentials for the IoT SAFE applet. There could be different ways for the communication device 200 to obtain the first credentials. Different embodiments relating thereto will now be described in turn.

In some aspects, the first credentials are obtained as part of subscription profile download. That is, the communication device 200 might have a subscription profile, and in a first embodiment the first credentials are obtained by being downloaded to the communication device 200 as part of the subscription profile being downloaded to the communication device 200.

Upon having obtained, or downloaded, the subscription profile, the communication device 200 might parse profile elements of the subscription profile (e.g., using a Profile Package Interpreter; PPI) in order to identify the first credentials. That is, in some embodiments, the communication device 200 is configured to perform (optional) step S102*a* as part of step S102:

S102*a*: The communication device 200 parses, using a PPI, profile elements of the subscription profile for identifying the first credentials.

The PPI thus needs to be configured for identification of first credentials.

In some aspects, the profile element of the first credentials has a flag, or other type of indicator, as to whether the first credentials should be bound to an active subscription profile or not. That is, the flag is set when the first credentials are bound to an active subscription profile and the flag is not set when the first credentials are not bound to an active subscription profile. Hence, in some embodiments, the profile element carrying the first credentials comprises an indicator of whether (i) the first credentials are limited to be used only when the subscription profile in which the first credentials were downloaded is active or (ii) the first credentials are usable independently of which subscription profile is currently active in the wireless device 200. When the first credentials are stored into the first security domain also the indicator might be stored into the first security domain. If the first credentials are limited to be used only when the subscription profile in which the first credentials were downloaded is active, a subscription profile identifier such as the Integrated Circuit Card Identifier (ICCID) or ISD-P Application Identifier (AID) is also stored. Credentials downloaded from the subscription profile might thus be allowed to be permanent credentials usable independently of the active subscription profile. It could be the choice of the MNO whether this is allowed or not. The flag, or other type of indicator, can be introduced in the Profile Element (PE) carrying the first credentials to indicate whether the use of the first credentials is bound to the subscription profile being active or not. The PPI when parsing the subscription profile will act upon the flag. For example, the PPI either binds the first credentials to the subscription profile being active by assigning the subscription profile identifier according to the above as the subscription profile identifier to be stored along with the first credentials or marks the first credentials as always usable e.g. by assigning the all-zero ICCID or ISD-P AID as the subscription profile identifier to be stored along with the first credentials.

In further aspects, the first credentials are by the communication device 200 obtained after having downloaded the subscription profile. That is, the communication device 200 might have a subscription profile and in some embodiments the first credentials are obtained after the subscription profile has been downloaded to the communication device 200.

One way for the communication device 200 to obtain the first credentials after the communication device 200 has downloaded the subscription profile is for the communication device 200 to use the SIM OTA mechanism for the active subscription profile. That is, when the subscription profile is an active subscription profile, the first credentials are in some embodiments obtained by being downloaded to the communication device 200 using an OTA mechanism of the subscription module for the active subscription profile. The above-disclosed indicator, or flag, might then be downloaded to the communication device 200 using the OTA mechanism.

As disclosed above, the first credentials are, after successful storage, accessible only from within the first security domain. Further in this respect, the first credentials, when being obtained, might be encrypted. Thus, decryption might be required before use of the first credentials. Therefore, in some embodiments, the first credentials as obtained are encrypted, and before being stored in the first security domain of the subscription module, are decrypted inside the subscription module.

Aspects of the secure communication established in step S106 will now be disclosed.

The secure communication could be established using different communications and security protocols. In some non-limiting examples, the secure communication is based on any of: DTLS, TLS, OSCORE (short for Object Security for Constrained RESTful Environments).

In some aspects, it is verified that the subscription profile linked to the first credentials is active when the secure communication for the communication device 200 is established. In particular, in some embodiments, establishing, using at least one of the first credentials, secure communication for the communication device 200 as in step S106 comprises verifying by the IoT SAFE applet if usage of the at least one of the first credentials is limited to be used when a particular subscription profile is active and, if so, verifying that this particular subscription profile is currently active.

In some aspects, further credentials need to be established. Hence, in some embodiments, the communication device 200 is configured to perform (optional) step S108:

S108: The communication device 200 obtains a trigger for establishment of further credentials.

The trigger might be set by, and obtained from, the network node 300 or from an application (which in turn could be triggered by the network node 300) in the communication device 200.

In some embodiments, the further credentials are then established by the IoT SAFE applet and then stored inside the first security domain of the subscription module. Both when the trigger is obtained from the network node 300 and when the trigger is obtained from an application, the establishment of the further credentials is triggered by an application via the IoT SAFE applet interface. The further credentials are then, when stored in the first security domain, marked as usable independently of which subscription profile is active in the communication device 200.

In some aspects, the first credentials are used when further credentials of the communication device 200 are to be established. A proof of establishment of the further credentials can then be generated in the IoT SAFE applet. Hence, in some embodiments, the communication device 200 is configured to perform (optional) step S110:

S110: The communication device 200 generates a proof of establishment in the first security domain of the subscription module that the further credentials have been established by the IoT SAFE applet in the first security domain. At least one of the first credentials already stored in the first security domain of the subscription module is used in establishing the proof.

The proof of establishment (and potential public credentials) might then be sent to the network node 300. Hence, in some embodiments, the communication device 200 is configured to perform (optional) step S112:

S112: The communication device 200 provides the proof of establishment and any public part of the further credentials of the communication device 200 to the network node 300 for verification of the proof of establishment.

As disclosed above, the further credentials are usable independently of which subscription profile is active in the communication device 200. Hence, while being connected via the network of another MNO than the MNO to which the first credentials are bound, the further credentials can be used by the communication device 200 for establishing secure communication with an IoT service provider. In particular, in some embodiments, the communication device 200 is configured to perform (optional) step S114 when the first credentials were obtained from a first MNO of the network node 300:

S114: The communication device 200 establishes, using the further credentials, secure communication for the communication device 200 with an IoT service provider of the network node 300, wherein a subscription profile in the subscription module of a second MNO is active.

As mentioned above, there are two variants of the IoT SAFE applet; a first variant supporting cryptographic operations that make use of both asymmetric and symmetric credentials and a second variant only supporting cryptographic operations using symmetric credentials for use with very constrained devices. The IoT SAFE applet disclosed herein might be any of these variants. For the first variant of the IoT SAFE apple, the first credential(s) that is/are part of the subscription profile might be a symmetric key, a private key, a device certificate, and/or a CA certificate. For the second variant, the first credential(s) that is/are part of the subscription profile is a symmetric key, e.g. 128 bits, for use with TLS-PSK or DTLS-PSK based secure communication, where PSK is short for pre-shared key. A PSK identifier may also be included as part of the subscription profile or a device identifier already known to the IoT service provider is used, e.g. International Mobile Equipment Identity (IMEI) or equipment identifier (EID).

In some examples the MNO provides temporary credential(s), e.g. a symmetric key, via the subscription profile, but the MNO never delivers this credential(s) to the IoT service provider. Instead the MNO uses the device and data management protocol, e.g. the LwM2M protocol, to trigger establishment of further credential(s) not bound to a specific subscription profile. Then upon successful installation of the further credential(s) the MNO provides the necessary information about the further credentials to the IoT service provider. The MNO may then trigger (via e.g. the LwM2M protocol) the device application to delete temporary credential(s).

Figure 3:
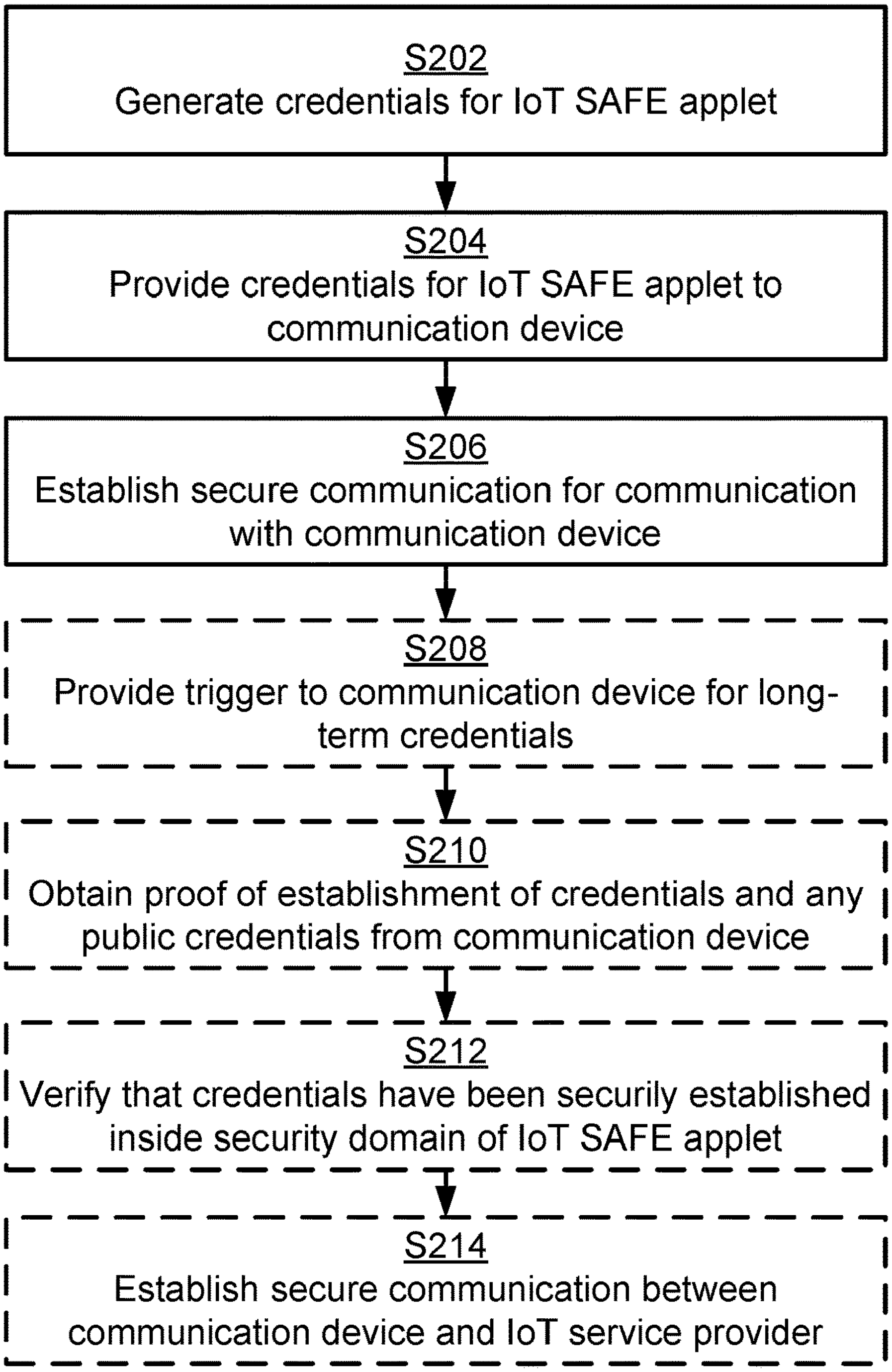

Reference is now made to FIG. 3 illustrating a method for handling credentials of an IoT SAFE applet as performed by the network node 300 according to an embodiment. Parallel reference is made to the signalling diagram of FIG. 4.

S202: The network node 300 generates credentials for the IoT SAFE applet.

S204: The network node 200 provides the credentials for the IoT SAFE applet to the communication device 200.

As disclosed above, the communication device 200 establishes secure communication with the network node 300. Hence, the network node 300 is configured to perform step S206:

S206: The network node 300 establishes, using at least one of the credentials, secure communication with the communication device 200. Here, the secure communication is established at the communication device 200 using the IoT SAFE applet.

Embodiments relating to further details of handling credentials of an IoT SAFE applet as performed by the network node 300 will now be disclosed.

Since further credentials will be introduced below, the above introduced credentials (i.e., the credentials as generated in step S202, provided in step S204, and used in step S206) will hereinafter be referred to as first credentials.

There might be different ways for the network node 300 to generate the first credentials. In some non-limiting examples, the first credentials are generated by any of: an MNO of the network node 300, a provisioning server of the network node 300, an IoT service provider of the network node 300.

As disclosed above, in some aspects, the IoT SAFE applet is downloaded to the communication device 200 as part of subscription profile download. That is, the communication device 200 might have a subscription profile, and in an embodiment the IoT SAFE applet is provided to the communication device 200 as part of the network node 300 providing the subscription profile to the communication device 200.

As disclosed above, in some aspects, the first credentials are obtained as part of subscription profile download. That is, the communication device 200 might have a subscription profile, and in an embodiment the first credentials are provided to the communication device 200 as part of the network node 300 providing the subscription profile to the communication device 200.

As disclosed above, in some aspects, the profile element of the first credentials has a flag, or other type of indicator, as to whether the first credentials should be bound to an active subscription profile or not. Hence, in some embodiments, when the first credentials are provided in a profile element of the subscription profile, the profile element carrying the first credentials comprises an indicator of whether the first credentials are bound to that the subscription profile is active or not bound to that the subscription profile is active.

As disclosed above, in further aspects, the first credentials are by the communication device 200 obtained after having downloaded the subscription profile. That is, the communication device 200 might have a subscription profile and in some embodiments the first credentials are provided to the communication device 200 by the network node 300 after having provided the subscription profile to the communication device 200.

As disclosed above, the secure communication could be established using different communications and security protocols. In some non-limiting examples, the secure communication is based on any of: DTLS, TLS, OSCORE.

As disclosed above, in some aspects, the network node 300 triggers the communication device 200 to establish further credentials. Hence, according to some embodiments, the network node 300 is configured to perform (optional) step S208:

S208: The network node 300 provides a trigger to the communication device 200 for establishment of further credentials.

As disclosed above, a proof of establishment (and potential public credentials) of the further credentials might be sent to the network node 300 from the communication device 200. Hence, in some embodiments, the network node 300 is configured to perform (optional) step S210:

S210: The network node 300 obtains a proof of establishment of the further credentials by the IoT SAFE applet of the communication device 200 and any public part of the further credentials.

The network node 300 might then, using the received proof and any public credentials, verify that the further credentials were securely established inside the IoT SAFE applet. That is, in some embodiments, the network node 300 is configured to perform (optional) step S212:

S212: The network node 300 verifies, using the proof of establishment, at least one of the first credentials, and any public part of the further credentials, that the further credentials have been securely established inside a security domain of the IoT SAFE applet.

As disclosed above, the further credentials can be used by the communication device 200 for establishing secure communication with another MNO than the MNO to which the first credentials are bound. In particular, in some embodiments, the network node 300 is configured to perform (optional) step S214 when the first credentials were provided to the communication device 200 from a first MNO of the network node 300:

S214: The network node 300 establishes, using the further credentials, secure communication between the communication device 200 and an IoT service provider of the network node 300, while the communication device 200 is connected to the network of the second MNO.

Figure 5:
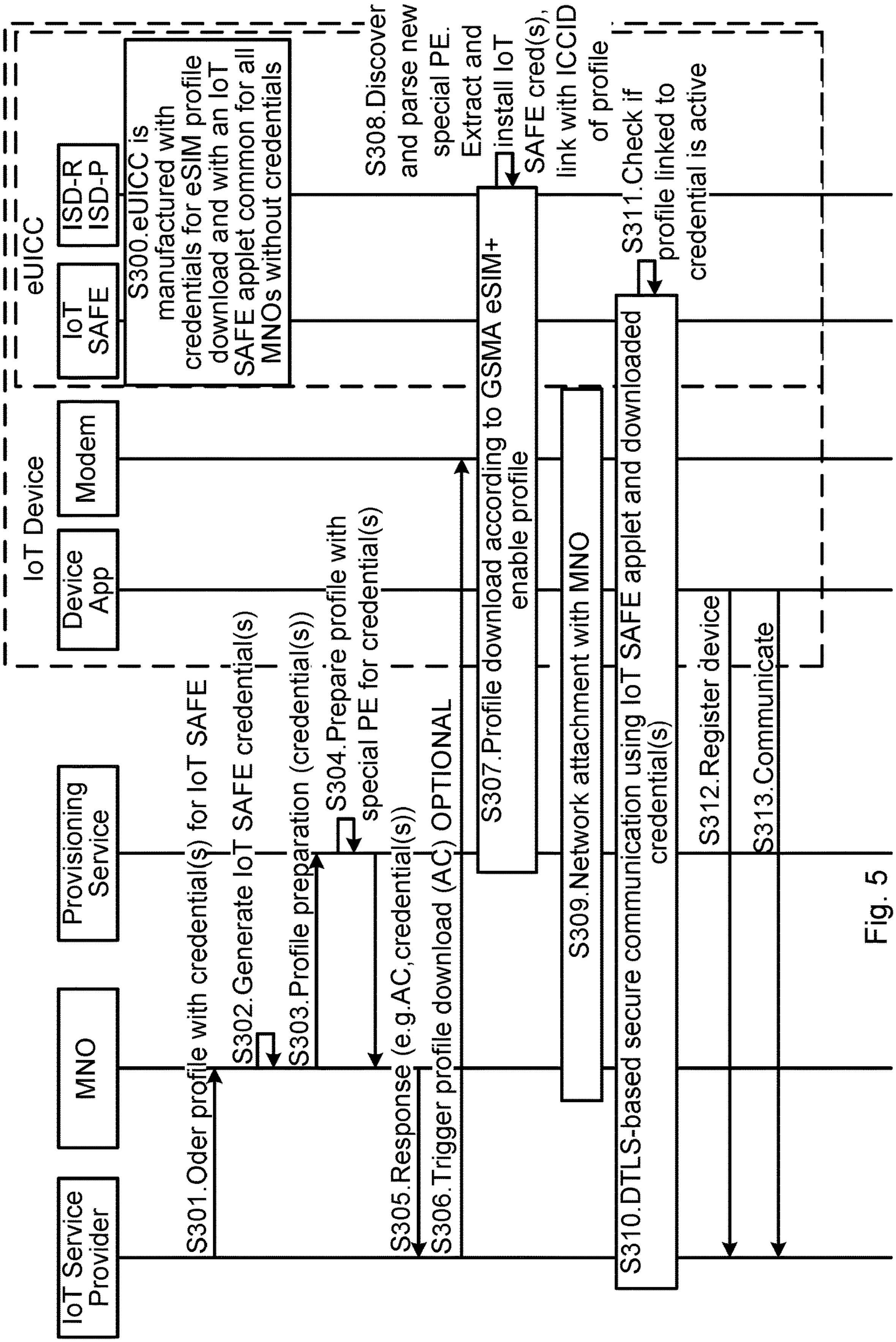

One particular embodiment for download of first credentials as part of the subscription profile based on at least some of the above disclosed embodiments will now be disclosed in detail with reference to the signalling diagram of FIG. 5 (where all the credentials are first credentials according to the above).

In this embodiment each MNO provides credentials for use with the IoT SAFE applet through the subscription profile. In the GSMA Remote SIM Provisioning standards for M2M devices and consumer devices the download, parsing and installation of a subscription profile is split between one Issuer Security Domain Root (ISD-R) and one or more Issuer Security Domain Profiles (ISD-P), where the ISD-R is the security domain of the subscription module issuer and ISD-P is the security domain where a subscription profile is stored. Upon subscription profile download and installation, the ISD-R creates a new ISD-P in which the new subscription profile shall reside. It is in the ISD-P the encrypted subscription profile package is decrypted and parsed.

The PPI of the operating system of the subscription module is invoked to parse the subscription profile package upon successful decryption. The PPI is configured to handle parsing of the credentials. The credentials may be stored in a dedicated Profile Element (PE) recognized by the PPI. Alternatively, an existing profile element, such as PE-Non-Standard, is used with a dedicated issuer ID identifying IoT SAFE credential provisioning. Upon successful parsing of the credentials the PPI is privileged to store the credentials into the security domain of the IoT SAFE applet where the IoT SAFE applet can retrieve the credentials.

The credentials delivered in a subscription profile of a given MNO should only be usable by device applications when that particular subscription profile is active. For this reason, the PPI associates each credential obtained via a subscription profile with the ICCID of the subscription profile. As an alternative to ICCID of the subscription profile the Application Identifier (AID) of the ISD-P in which the subscription profile is installed may be used. Generation or establishment of credentials may also be performed by the IoT SAFE applet triggered by a device application via the IoT SAFE applet. Credentials may also be provided to the IoT SAFE applet for storage by a device application. In these two cases the credentials are always usable in operations independently of what subscription profile that is active. The credentials are then marked as always usable e.g. by assigning the all-zero ICCID or ISD-P AID.

For each IoT SAFE operation involving the use of a credential the IoT SAFE applet checks that the credential is usable by checking that the ICCID/ISD-P AID associated with the credential in the IoT SAFE applet belongs to an active profile. For example, in the current case of only one active subscription profile at a time, the IoT SAFE applet may read the EF_ICCID file to obtain the ICCID of the active subscription profile and compare it to the ICCID is stored with the credential. The IoT SAFE applet may perform this operation once and then cache the currently active ICCID internally as long as the application remains selected.

In the below it is for illustrative purposes assumed that an IoT service provider owns or license a batch of communication devices for which the IoT service provider orders subscription profiles.

S300: The eUICC is manufactured with eSIM support including credentials for subscription profile download. The eUICC is also configured with an IoT SAFE applet common for all MNOs. The IoT SAFE applet is stored in a dedicated security domain according to above. The IoT SAFE applet does not contain any credentials.

S301: The IoT service provider orders a subscription profile with credential(s) for IoT SAFE from an MNO for the communication device 200. The credential(s) is/are to be used in establishing secure communication between the communication device 200 and an IoT service.

S302: The MNO generates credential(s) for the communication device 200.

S303: The MNO interacts with the provisioning server to prepare a subscription profile for the communication device 200. The generated credential(s) is/are transferred from the MNO to the provisioning server. Alternatively, the IoT SAFE credentials are generated at the provisioning server and delivered to the MNO.

S304: The provisioning server prepares a subscription profile where the credential(s) is/are included.

S305: The MNO provides a response back to the IoT service provider, where the response comprises the credential(s). The credential(s) is/are securely delivered based on established secure communication. The response may also comprise information needed for triggering subscription profile download (e.g. an Activation Code (AC)).

S306: (Optional) In case the eSIM consumer variant is used and an AC was received in step S305 the AC is delivered to the Local Profile Assistant (LPA) of the communication device 200.

S307: Subscription profile download, installation, and enabling of the downloaded subscription profile is performed. In case of the eSIM consumer variant the LPA triggers subscription profile download using information from the AC.

S308: During subscription profile installation the PPI (running in the ISD-P security domain) parses the subscription profile and extracts the credential(s) and stores the credential(s) in IoT SAFE applet storage. The PPI associates each credential with the ICCID of the subscription profile.

S309: When the new subscription profile is activated the communication device 200 attaches to the MNO using the new subscription profile.

S310: The device application establishes secure communication based on DTLS with the IoT service provider using the IoT SAFE applet and the new credential(s).

S311: When IoT SAFE operations requested by the device application is accessing a credential stored in the IoT SAFE applet, the IoT SAFE applet checks that the subscription profile linked with the credential(s) (if any) is activated.

S312: The communication device 200 is registered with the IoT service provider.

S313: The communication device 200, using the credential(s), securely communicates with the IoT service provider.

Steps S301-S305 may be performed once for a whole batch of communication devices 200 instead of for an individual communication device 200 as shown here.

Figure 6:
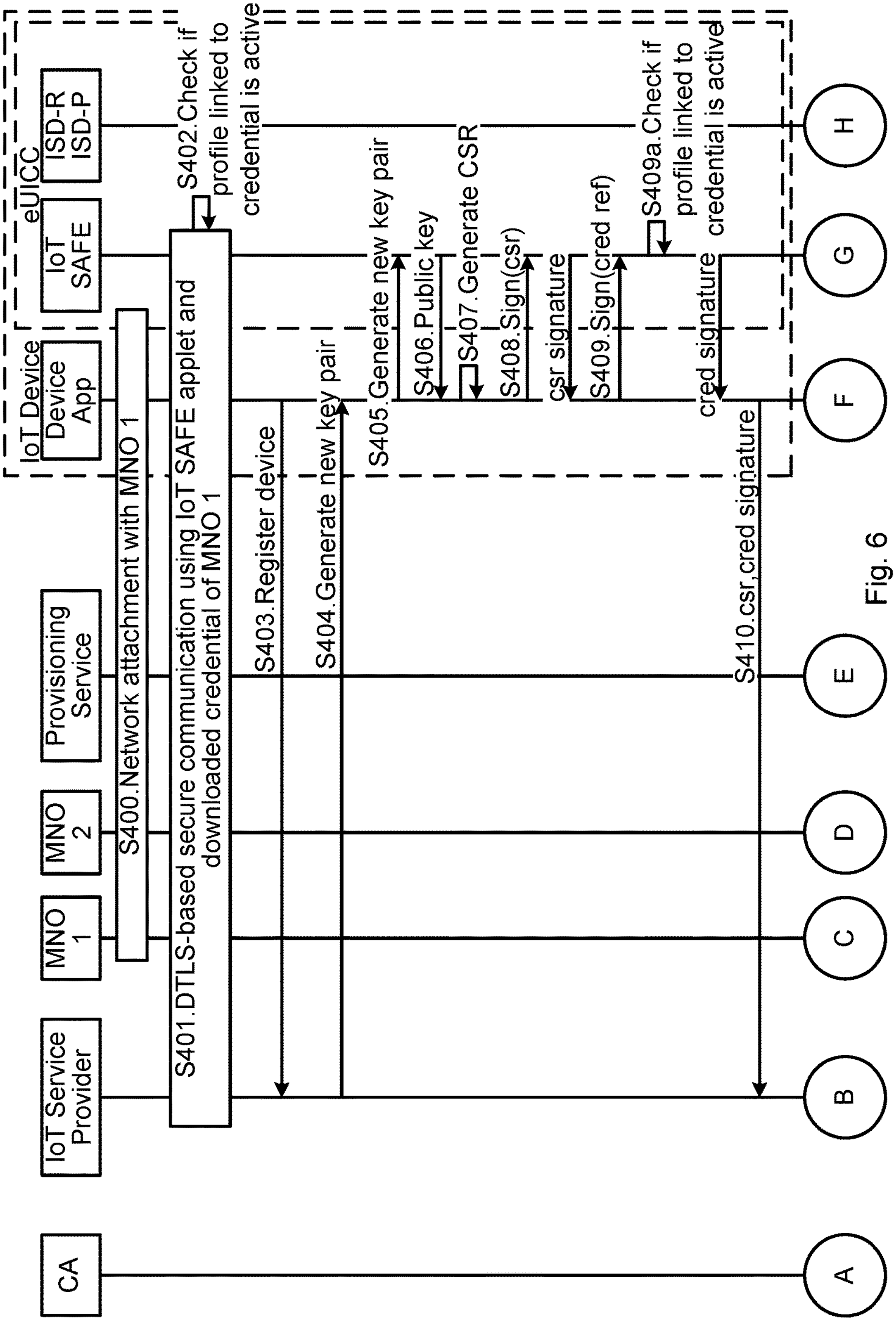
Figure 6:
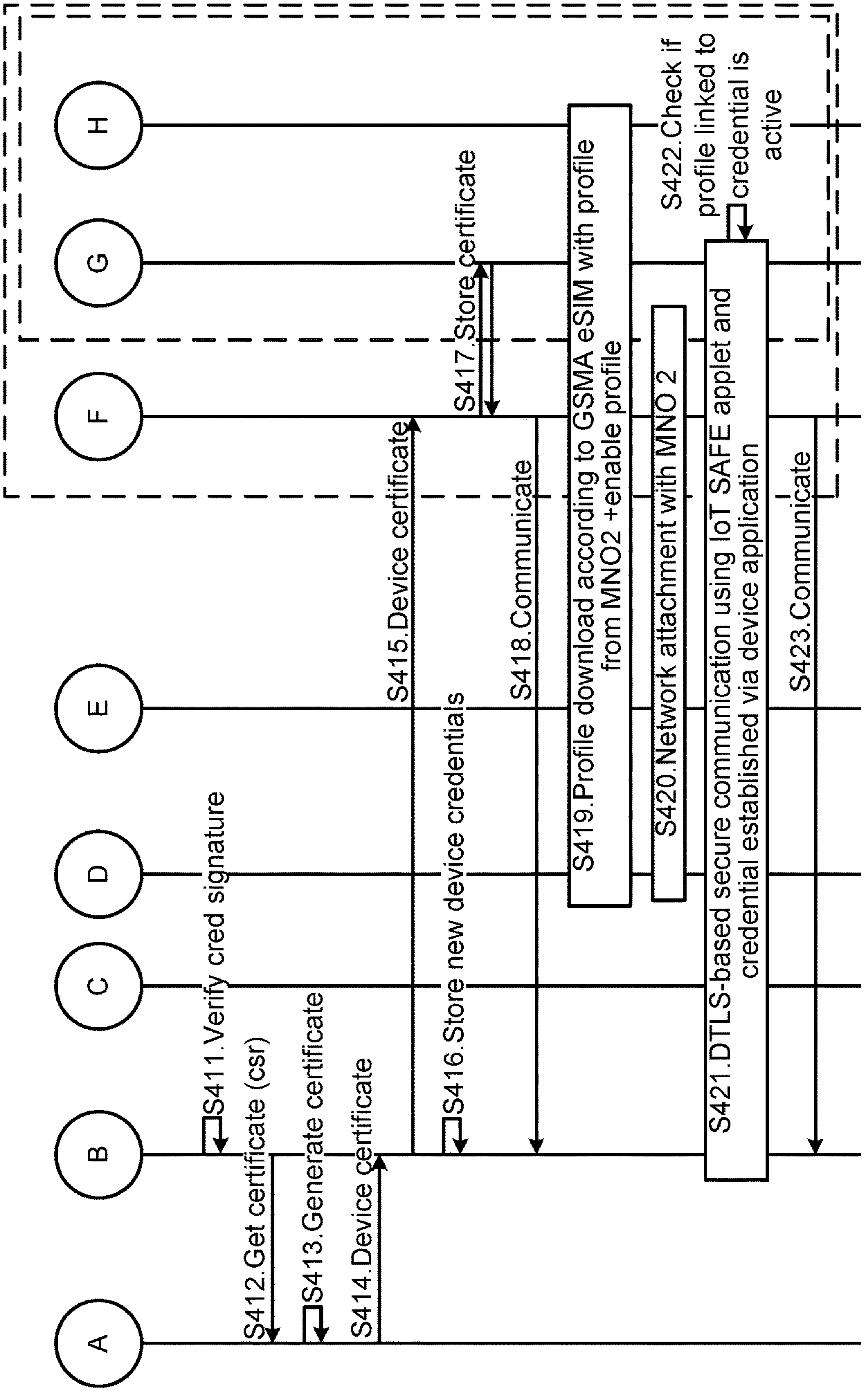

One particular embodiment for establishment of further credentials not linked to a specific subscription profile based on at least some of the above disclosed embodiments will now be disclosed in detail with reference to the signalling diagram of FIG. 6.

In the case of the first mentioned variant of the IoT SAFE applet, a device application may utilize first credentials downloaded via a subscription profile (and bound to a specific subscription profile) to establish secure communication with a remote server controlled by the IoT service provider in order to establish further credentials that are not bound to a specific MNO and allowing the further credentials to be used whilst the communication device 200 is connected to different networks. This is possible since these further credentials generated, or established, by the IoT SAFE applet triggered by a device application via the IoT SAFE applet, or first credentials provided to the IoT SAFE applet for storage by a device application, are always usable in operations independently of what subscription profile that is active.

Credentials generated/established in the IoT SAFE applet are not accessible by the device application. The IoT SAFE applet ensures that these credentials are not accessed and when the OTA mechanism is used the MNO provides guarantees to the IoT service provider that these credentials are generated/established in the IoT SAFE applet. But the IoT service provider must still trust the device application. When the device application is generating/establishing further credentials via the IoT SAFE applet, even though the IoT service provider trusts the device application, the IoT service provider may want to have proof that the further credentials are generated/established in the IoT SAFE applet and not outside the IoT SAFE applet by the device application.

S400: The communication device 200 is attached to the network of MNO1 for which the communication device 200 has previously downloaded a subscription profile and credential(s) bound to the subscription profile. The credential(s) has/have been securely delivered from MNO1 to the IoT service provider.

S401: The device application establishes secure communication based on DTLS with the IoT service provider using the credential(s). In this example the credential(s) is a symmetric key and DTLS-PSK is used to secure the communication.

S402: When IoT SAFE operations requested by the device application is accessing credential(s) stored in the IoT SAFE applet (in this case the symmetric key) the IoT SAFE applet checks that the subscription profile linked with the credential(s) (if any) is activated.

S403: The communication device 200 is registered with the IoT service provider using the device and data management protocol. In this example the LwM2M protocol is used.

S404: Using the LwM2M protocol, the IoT service provider sends a request to the device application to trigger the generation of further credential(s), in the form of a private-public key pair, in the IoT SAFE applet.

S405: The device application triggers the IoT SAFE applet to generate the further credential(s). The further credential(s), in terms of the private-public key pair, is generated by the IoT SAFE applet.

S406: The public key of the key pair is returned to the device application.

S407: The device application (or device middleware) generates a Certificate Signing Request (CSR) for the received public key.

S408: The device application uses the IoT SAFE applet Sign( )-operation to sign the CSR using the new private key.

S409: The device application uses the IoT SAFE applet Sign( )-operation to sign the first credential(s), for example a symmetric key, bound to the subscription profile. Further aspects relating to the signing will be disclosed below. The IoT SAFE applet checks that the first credential(s) is/are allowed to be used by checking that the subscription profile bound to first credential(s) is active. The signature on the first credential(s) is then returned.

S410: Using the LwM2M protocol, the CSR (including its signature) and the credential signature is returned as a response to the request in step S404.

S411: The IoT service provider verifies the received credential signature.

S412: Upon successful verification of the credential signature, the IoT service provider requests a certificate from a CA. The CSR is provided as part of the request.

S413: Upon examining the CSR (e.g. verifying the CSR signature), the CA generates a certificate for the communication device 200.

S414: The device certificate is returned to the IoT service provider.

S415: The IoT service provider uses the LwM2M protocol to send the certificate to the communication device 200.

S416: The IoT service provider stores the further credentials.

S417: The device application stores the new device certificate in the IoT SAFE applet.

S418: (Optional) The communication device 200 continues to communicate securely using the first credential(s). Alternatively, the communication device 200 is rebooted to start using the further credential(s).

S419: A new subscription profile is downloaded and installed to the communication device 200 from a second MNO, denoted MNO2. This may be due to that the communication device 200 is moved to new area where the new subscription profile is more suitable to be used. The new subscription profile is enabled.

S420: The communication device 200 attaches to the network of MNO2.

S421: The device application establishes secure communication based on DTLS with the IoT service provider using the further credential(s).

S422: When IoT SAFE operations requested by the device application is accessing credential(s) stored in the IoT SAFE applet the IoT SAFE applet checks that the subscription profile linked with the credential(s) (if any) is activated. In this case there is no subscription profile linked to the further credential(s).

S423: The communication device 200, using the further credential(s), securely communicates with the IoT service provider.

For steps S410-S416 the communication device 200 might as an alternative on its own connect to a CA using Enrollment over Secure Transport (EST) over the CoAP protocol, deliver the CSR, and obtain a device certificate. The device certificate might then either be obtained by the IoT service provider from the communication device 200 or from the CA.

Further aspects of providing proof that the further credentials are generated/established in the IoT SAFE applet will now be disclosed. As disclosed above, the IoT service provider may want to have proof that the further credentials are generated/established in the IoT SAFE applet and not outside the IoT SAFE applet by a rogue device application.

Further aspects of how the first credential(s) and the further credential(s) impact how proof of the that the further credentials are generated/established in the IoT SAFE applet can be provided will now be disclosed for different examples of first credential(s) and further credential(s).

In some examples the first credential(s) is a symmetric key and the further credential(s) is a private-public key pair. Comparing to IoT SAFE v1.0, one way to provide proof that the thus new key pair is generated in the IoT SAFE applet is to have the applet Sign( )-operation extended to sign an internal IoT SAFE secret credential, such as a symmetric key. The device application can call this function and request the new private key to be used to sign the old symmetric key. The signature is then delivered to the IoT service provider along with the public key (e.g. as in FIG. 6). The IoT service provider has the symmetric key and may then verify the signature using the received public key. The IoT service provider is convinced that the private key was generated in the IoT SAFE applet since only private keys internal to the IoT SAFE applet can be used to sign keys internal to the IoT SAFE applet. An alternative approach is to extend the Sign( )-operation allowing a symmetric key and encryption algorithm to be specified and where the signature is encrypted before it is delivered to the device application. The device application can use this operation when signing the CSR. The IoT service provider can then decrypt the signature using the first credential(s) such that the IoT service provider can obtain the signature in plain in order to provide it to the CA for issuing a certificate.

In some examples the first credential(s) and the further credential(s) are private-public key pairs. One way to provide proof that the new key pair is generated in the IoT SAFE applet is for the IoT service provider to generate and wrap a symmetric key using the old public key of the IoT SAFE applet and send the wrapped key as part of the request to generate a new key pair (as in step S405 of FIG. 6). The IoT SAFE applet then unwraps the thus wrapped key and store the thus unwrapped key as an internal key in the IoT SAFE applet. The extended Sign( )-operation described above is then used to sign the symmetric key using the new private key and provide the signature back to the IoT service provider for verification similar to what was described above.

In some examples the first credential(s) is a private-public key pair and the further credential(s) is a symmetric key. In the case the further credential(s) is a symmetric key it is typically generated by the IoT service provider and sent to the communication device 200. The same wrapping mechanism as described above can be used to transfer the symmetric into the IoT SAFE internal storage. A proof may be provided to the IoT service provider that the symmetric key was successfully installed. For example, the applet extended Sign( )-operation described above can be used to sign the new symmetric key using the old private key and provide the signature back to the IoT service provider for verification. Another example is to use the Compute pseudorandom function family (PRF) operation or the Compute Hash-based key derivation function (HKDF) operation with the new symmetric key on some agreed data to provide some footprint data that can be provided to the IoT service provider for verification and that proves the symmetric key was successfully installed.

In some examples the first credential(s) is a symmetric key and the further credential(s) is a symmetric key. The further credential(s) is a symmetric key generated by the IoT service provider. The new key is wrapped (i.e. encrypted) using e.g. the Advanced Encryption Standard (AES) with the old symmetric key and is then sent to the communication device 200. An AES unwrap operation is used by the IoT SAFE applet to decrypt and install the new symmetric key. A proof may be provided to the IoT service provider that the symmetric key was successfully installed. For example, the Compute PRF operation or the Compute HKDF operation may be used with the new symmetric key on some agreed data to provide some footprint data that can be provided to the IoT service provider for verification and that proves the symmetric key was successfully installed.

Figure 7:
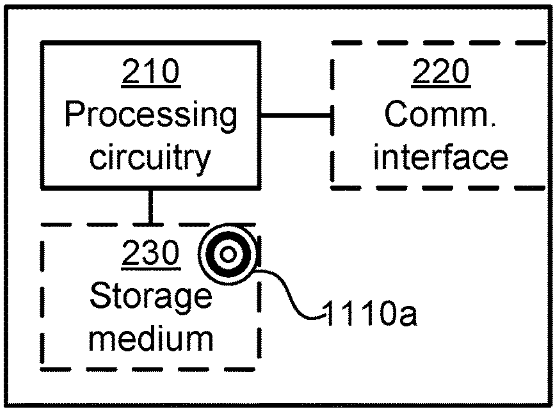
FIG. 7 is a schematic diagram showing functional units of a communication device according to an embodiment.

FIG. 7 schematically illustrates, in terms of a number of functional units, the components of a communication device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010*a* (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the communication device 200 to perform a set of operations, or steps, as disclosed above. For example, the storage medium 230 may store the set of operations, and the processing circuitry 210 may be configured to retrieve the set of operations from the storage medium 230 to cause the communication device 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The communication device 200 may further comprise a communications interface 220 for communications with other entities, functions, nodes, and devices. As such the communications interface 220 may comprise one or more transmitters and receivers, comprising analogue and digital components.

The processing circuitry 210 controls the general operation of the communication device 200 e.g. by sending data and control signals to the communications interface 220 and the storage medium 230, by receiving data and reports from the communications interface 220, and by retrieving data and instructions from the storage medium 230. Other components, as well as the related functionality, of the communication device 200 are omitted in order not to obscure the concepts presented herein.

Figure 8:
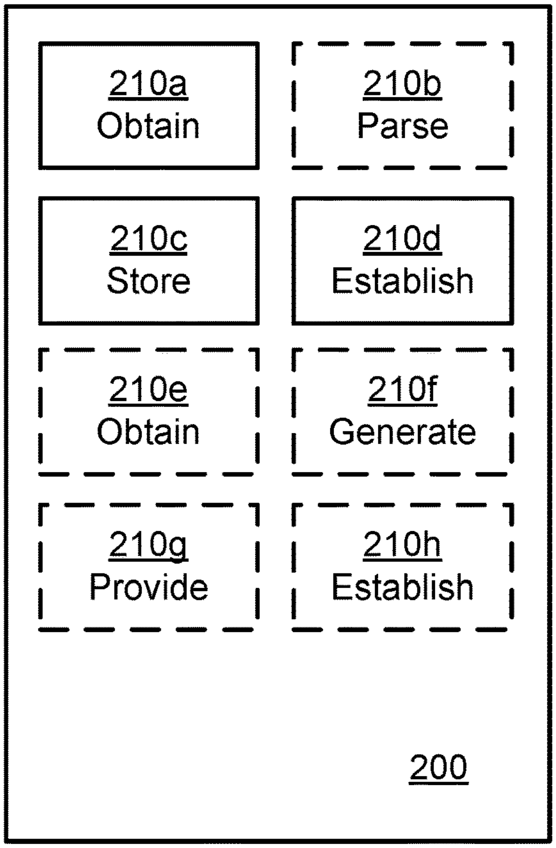
FIG. 8 is a schematic diagram showing functional modules of a communication device according to an embodiment.

FIG. 8 schematically illustrates, in terms of a number of functional modules, the components of a communication device 200 according to an embodiment. The communication device 200 of FIG. 8 comprises a number of functional modules; an obtain module 210*a* configured to perform step S102, a store module 210*c* configured to perform step S104, and an establish module 210*d* configured to perform step S106. The communication device 200 of FIG. 8 may further comprise a number of optional functional modules, such as any of a parse module 210*b* configured to perform step S102*a*, an obtain module 210*e* configured to perform step S108, a generate module 210*f* configured to perform step S110, a provide module 210*g* configured to perform step S112, and an establish module 210*h* configured to perform step S114.

In general terms, each functional module 210*a*-210*f* may be implemented in hardware or in software. Preferably, one or more or all functional modules 210*a*-210*f* may be implemented by the processing circuitry 210, possibly in cooperation with the communications interface 220 and/or the storage medium 230. The processing circuitry 210 may thus be arranged to from the storage medium 230 fetch instructions as provided by a functional module 210*a*-210*f* and to execute these instructions, thereby performing any steps of the communication device 200 as disclosed herein.

Figure 9:
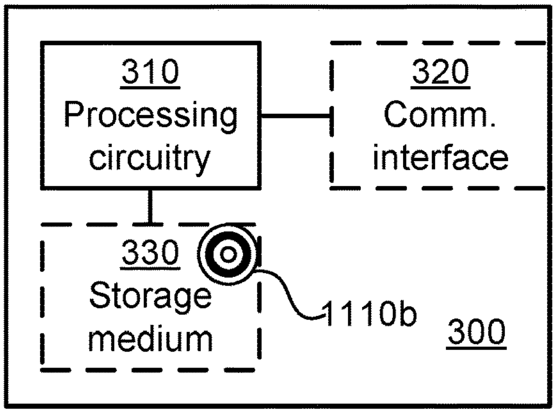
FIG. 9 is a schematic diagram showing functional units of a network node according to an embodiment.

FIG. 9 schematically illustrates, in terms of a number of functional units, the components of a network node 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1010*b* (as in FIG. 11), e.g. in the form of a storage medium 330. The processing circuitry 310 may further be provided as at least one application specific integrated circuit (ASIC), or field programmable gate array (FPGA).

Particularly, the processing circuitry 310 is configured to cause the network node 300 to perform a set of operations, or steps, as disclosed above. For example, the storage medium 330 may store the set of operations, and the processing circuitry 310 may be configured to retrieve the set of operations from the storage medium 330 to cause the network node 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The network node 300 may further comprise a communications interface 320 for communications with other entities, functions, nodes, and devices. As such the communications interface 320 may comprise one or more transmitters and receivers, comprising analogue and digital components.

The processing circuitry 310 controls the general operation of the network node 300 e.g. by sending data and control signals to the communications interface 320 and the storage medium 330, by receiving data and reports from the communications interface 320, and by retrieving data and instructions from the storage medium 330. Other components, as well as the related functionality, of the network node 300 are omitted in order not to obscure the concepts presented herein.

Figure 10:
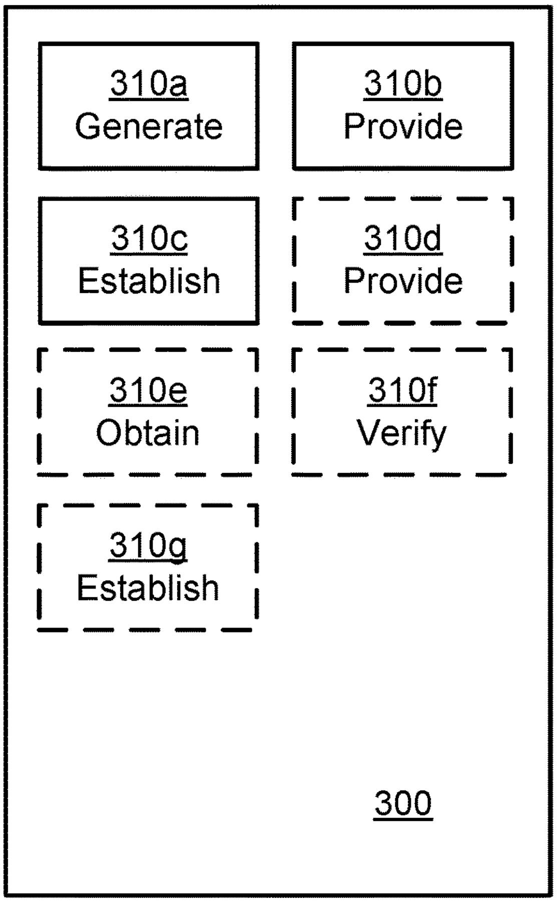
FIG. 10 is a schematic diagram showing functional modules of a network node according to an embodiment.

FIG. 10 schematically illustrates, in terms of a number of functional modules, the components of a network node 300 according to an embodiment. The network node 300 of FIG. 10 comprises a number of functional modules; a generate module 310*a* configured to perform step S202, a provide module 310*b* configured to perform step S204, and an establish module 310*c* configured to perform step S206. The network node 300 of FIG. 10 may further comprise a number of optional functional modules, such as any of a provide module 310*d* configured to perform step S208, an obtain module 310*e* configured to perform step S210, a verify module 310*f* configured to perform step S212, and an establish module 310*g* configured to perform step S214.

In general terms, each functional module 310*a*-310*g* may be implemented in hardware or in software. Preferably, one or more or all functional modules 310*a*-310*g* may be implemented by the processing circuitry 310, possibly in cooperation with the communications interface 320 and/or the storage medium 330. The processing circuitry 310 may thus be arranged to from the storage medium 330 fetch instructions as provided by a functional module 310*a*-310*g* and to execute these instructions, thereby performing any steps of the network node 300 as disclosed herein.

The network node 300 may be provided as a standalone device or as a part of at least one further device. For example, the network node 300 may be provided in a node of the radio access network or in a node of the core network. Alternatively, functionality of the network node 300 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time.

Thus, a first portion of the instructions performed by the network node 300 may be executed in a first device, and a second portion of the instructions performed by the network node 300 may be executed in a second device; the herein disclosed embodiments are not limited to any particular number of devices on which the instructions performed by the network node 300 may be executed. Hence, the methods according to the herein disclosed embodiments are suitable to be performed by a network node 300 residing in a cloud computational environment. Therefore, although a single processing circuitry 210, 310 is illustrated in FIG. 9 the processing circuitry 310 may be distributed among a plurality of devices, or nodes. The same applies to the functional modules 310*a*-310*g* of FIG. 10 and the computer program 1020*b* of FIG. 11.

Figure 11:
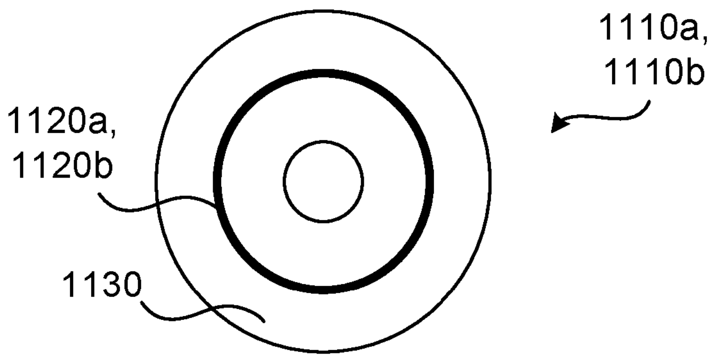
FIG. 11 shows one example of a computer program product comprising computer readable means according to an embodiment.

FIG. 11 shows one example of a computer program product 1010*a*, 1010*b* comprising computer readable means 1030. On this computer readable means 1030, a computer program 1020*a* can be stored, which computer program 1020*a* can cause the processing circuitry 210 and thereto operatively coupled entities and devices, such as the communications interface 220 and the storage medium 230, to execute methods according to embodiments described herein. The computer program 1020*a* and/or computer program product 1010*a* may thus provide means for performing any steps of the communication device 200 as herein disclosed. On this computer readable means 1030, a computer program 1020*b* can be stored, which computer program 1020*b* can cause the processing circuitry 310 and thereto operatively coupled entities and devices, such as the communications interface 320 and the storage medium 330, to execute methods according to embodiments described herein. The computer program 1020*b* and/or computer program product 1010*b* may thus provide means for performing any steps of the network node 300 as herein disclosed.

In the example of FIG. 11, the computer program product 1010*a*, 1010*b* is illustrated as an optical disc, such as a CD (compact disc) or a DVD (digital versatile disc) or a Blu-Ray disc. The computer program product 1010*a*, 1010*b* could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020*a*, 1020*b* is here schematically shown as a track on the depicted optical disk, the computer program 1020*a*, 1020*b* can be stored in any way which is suitable for the computer program product 1010*a*, 1010*b*.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for handling credentials of an IoT SAFE applet, the method being performed by a communication device, wherein the communication device is storing the IoT SAFE applet in a first security domain of a subscription module in the communication device, wherein the first security domain is free from any subscription profile and is different from any security domain of the subscription module for storing subscription profiles, and wherein the IT SAFE applet is independent from any mobile network operator (MNO), and wherein the communication device is without credentials for the IoT SAFE applet for establishing secure communication for the communication device with a network node, the method comprising:

obtaining credentials for the IoT SAFE applet from the network node;

storing the credentials in the first security domain of the subscription module, wherein the credentials, after successful storage, are accessible only from within the first security domain;

establishing, using the IoT SAFE applet and at least one of the credentials, secure communication for the communication device with the network node;

the method further comprising:

obtaining a trigger for establishment of further credentials, wherein the trigger is set by the network node or an application in the communication device;

wherein the further credentials are established by the IoT SAFE applet and then stored inside the first security domain of the subscription module, and wherein the further credentials are, when stored in the first security domain, marked as usable independently of which subscription profile is active in the communication device, generating a proof of establishment in the first security domain of the subscription module that the further credentials have been established by the IoT SAFE applet, wherein at least one of the credentials already stored in the first security domain of the subscription module is used in establishing the proof; and providing the proof of establishment and any public part of the further credentials of the communication device to the network node for verification of the proof of establishment.

2. The method according to claim 1, wherein the communication device is preconfigured with the IoT SAFE applet.

3. The method according to claim 1, wherein the communication device has a subscription profile, and wherein the IoT SAFE applet is downloaded to the communication device as part of the subscription profile being downloaded to the communication device, and wherein as part of installing the subscription profile into the subscription module, the subscription profile, except the IoT SAFE applet, is stored in at least one other security domain of the subscription module, and the IoT SAFE applet is stored in the first security domain.

4. The method according to claim 1, wherein the communication device has a subscription profile, and wherein the credentials are obtained by being downloaded to the communication device as part of the subscription profile being downloaded to the communication device.

5. The method according to claim 4, wherein obtaining the credentials comprises:

parsing, using a Profile Package Interpreter, PPI, profile elements of the subscription profile for identifying the credentials.

6. The method according to claim 5, wherein the profile element carrying the credentials comprises an indicator of whether the credentials are limited to be used only when the subscription profile in which the credentials were downloaded is active or the credentials are usable independently of which subscription profile is currently active in the wireless device.

7. The method according to claim 1, wherein the credentials as obtained are encrypted, and before being stored in the first security domain of the subscription module, are decrypted inside the subscription module.

8. The method according to claim 1, wherein the communication device has a subscription profile, and wherein the credentials are obtained after the subscription profile has been downloaded to the communication device.

9. The method according to claim 8, wherein the subscription profile is an active subscription profile, and wherein the credentials are obtained by being downloaded to the communication device using an OTA mechanism of the subscription module for the active subscription profile.

10. The method according to claim 1, wherein the secure communication is based on any of: DTLS, TLS, OSCORE.

11. The method according to claim 6, wherein establishing, using at least one of the credentials, secure communication for the communication device comprises verifying by the IoT SAFE applet if usage of said at least one of the credentials is limited to be used when a particular subscription profile is active and, if so, verifying that said particular subscription profile is currently active.

12. The method according to claim 1, wherein the credentials were obtained from a first MNO of the network node, and wherein the method further comprises:

establishing, using the further credentials, secure communication for the communication device with an IoT service provider of the network node, wherein a subscription profile in the subscription module of a second MNO is active.

13. A method for handling credentials of an IoT SAFE applet, the method being performed by a network node, the method comprising:

generating credentials for the IoT SAFE applet;

providing the credentials for the IoT SAFE applet to a communication device;

establishing, using at least one of the credentials, secure communication with the communication device;

providing a trigger to the communication device for establishment of further credentials;

obtaining a proof of establishment of the further credentials by the IoT SAFE applet of the communication device and a any public part of the further credentials; and verifying, using the proof of establishment, at least one of the credentials, and the public part of the further credentials, that the further credentials have been securely established inside a security domain of the IoT SAFE applet.

14. The method according to claim 13, wherein the credentials are generated by any of: an MNO of the network node, a provisioning server of the network node, an IoT service provider of the network node.

15. The method according to claim 13, wherein the communication device has a subscription profile, and wherein the IoT SAFE applet is provided to the communication device as part of the network node providing the subscription profile to the communication device.

16. The method according to claim 13, wherein the communication device has a subscription profile, and wherein the credentials are provided to the communication device as part of the network node providing the subscription profile to the communication device.

17. A communication device for handling credentials of an IoT SAFE applet, wherein the communication device is storing the IoT SAFE applet in a first security domain of a subscription module in the communication device, wherein the first security domain is free from any subscription profile and is different from any security domain of the subscription module for storing subscription profiles, and wherein the IoT SAFE applet is independent from any mobile network operator (MNO), and wherein the communication device is without credentials for the IoT SAFE applet for establishing secure communication for the communication device with a network node, the communication device comprising processing circuitry, the processing circuitry being configured to cause the communication device to:

obtain credentials for the IoT SAFE applet from the network node;

store the credentials in the first security domain of the subscription module, wherein the credentials, after successful storage, are accessible only from within the first security domain;

establish, using the IoT SAFE applet and at least one of the credentials, secure communication for the communication device with the network node;

obtain a trigger for establishment of further credentials, wherein the trigger is set by the network node or an application in the communication device;

wherein the further credentials are established by the IoT SAFE applet and then stored inside the first security domain of the subscription module, and wherein the further credentials are, when stored in the first security domain, marked as usable independently of which subscription profile is active in the communication device;

generate a proof of establishment in the first security domain of the subscription module that the further credentials have been established by the IoT SAFE applet, wherein at least one of the credentials already stored in the first security domain of the subscription module is used in establishing the proof; and provide the proof of establishment and any public part of the further credentials of the communication device to the network node for verification of the proof of establishment.

18. The communication device according to claim 17, wherein the communication device is preconfigured with the IoT SAFE applet.

19. A network node for handling credentials of an IoT SAFE applet, the network node comprising processing circuitry, the processing circuitry being configured to cause the network node to:

generate credentials for the IOT SAFE applet;

provide the credentials for the IoT SAFE applet to a communication device;

establish, using at least one of the credentials, secure communication with the communication device;

provide a trigger to the communication device for establishment of further credentials;

obtain a proof of establishment of the further credentials by the IoT SAFE applet of the communication device and a public part of the further credentials; and verify, using the proof of establishment, at least one of the credentials, and the public part of the further credentials, that the further credentials have been securely established inside a security domain of the IoT SAFE applet.

20. The network node according to claim 19, wherein the credentials are generated by any of: an MNO of the network node, a provisioning server of the network node, an IoT service provider of the network node.

* * * * *